United States Patent
Sung et al.

(10) Patent No.: US 7,480,295 B2
(45) Date of Patent: Jan. 20, 2009

(54) METHOD FOR SUPPORTING MULTICAST SERVICE IN ETHERNET PASSIVE OPTICAL NETWORK SYSTEM

(75) Inventors: Jung Sik Sung, Daejeon (KR); Tae Il Kim, Daejeon (KR); Hyeong Ho Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 694 days.

(21) Appl. No.: 10/944,328

(22) Filed: Sep. 17, 2004

(65) Prior Publication Data

US 2005/0135365 A1    Jun. 23, 2005

(30) Foreign Application Priority Data

Dec. 17, 2003  (KR) .................. 10-2003-0092590

(51) Int. Cl.
H04L 12/28 (2006.01)
(52) U.S. Cl. .................. 370/390; 370/389; 370/392; 370/395.1; 370/400
(58) Field of Classification Search .................. None
See application file for complete search history.

(56) References Cited

U.S. PATENT DOCUMENTS

| | | | |
|---|---|---|---|
| 5,982,775 A | | 11/1999 | Brunner et al. |
| 6,563,830 B1 * | | 5/2003 | Gershon et al. ........ 370/395.53 |
| 7,245,621 B2 * | | 7/2007 | Sala et al. .................. 370/392 |
| 7,286,538 B2 * | | 10/2007 | Song et al. .................. 370/392 |
| 7,289,501 B2 * | | 10/2007 | Davis ........................ 370/390 |
| 7,293,090 B1 * | | 11/2007 | Saleh et al. ................. 709/226 |
| 2002/0146026 A1 * | | 10/2002 | Unitt et al. ................. 370/428 |
| 2003/0091045 A1 | | 5/2003 | Choi et al. |
| 2003/0137975 A1 * | | 7/2003 | Song et al. .................. 370/353 |
| 2004/0090970 A1 * | | 5/2004 | Sanchez et al. ............. 370/397 |
| 2004/0109450 A1 * | | 6/2004 | Kang et al. ................. 370/390 |
| 2004/0120315 A1 * | | 6/2004 | Han et al. ................... 370/389 |
| 2004/0120316 A1 * | | 6/2004 | McCormack et al. ....... 370/392 |
| 2005/0058118 A1 * | | 3/2005 | Davis et al. ................ 370/351 |
| 2005/0091313 A1 * | | 4/2005 | Zhou et al. ................. 709/204 |

FOREIGN PATENT DOCUMENTS

KR       1020030004725 A      1/2003

\* cited by examiner

*Primary Examiner*—Edan Orgad
*Assistant Examiner*—Andrew C Lee
(74) *Attorney, Agent, or Firm*—Blakely, Sokoloff, Taylor & Zafman

(57) ABSTRACT

There is provided a method for supporting a multicast service in an Ethernet passive optical network system. Since an Optical Network Unit (ONU) system monitors an IGMP (Internet Group Management Protocol) message and informs the monitored result of an Optical Line Terminal (OLT) system so that the OLT system creates L2 multicast forwarding table using a multicast address and ONU ID information in a PON port, the ONU system transmits the multicast packet only to a corresponding subscriber on the basis of the L2 multicast forwarding table when receiving a multicast packet. Therefore, it is possible to transfer a multicast packet only to a specific ONU system belonging to a corresponding multicast address group among a plurality of ONU systems.

9 Claims, 6 Drawing Sheets

METHOD FOR SUPPORTING MULTICAST SERVICE IN ETHERNET PASSIVE OPTICAL NETWORK SYSTEM

BACKGROUND OF THE INVENTION

This application claims the priority of Korean Patent Application No. 2003-92590, filed on Dec. 17, 2003, in the Korean Intellectual Property Office, the disclosure of which is incorporated herein in its entirety by reference.

1. Field of the Invention

The present invention relates to a method for supporting a multicast service, and more particularly, to a method for supporting a multicast service in an Ethernet Passive Optical Network (EPON).

2. Description of the Related Art

To allow an EPON system to support a multicast service, an Optical Line Terminal (OLT) system must support a multicast service for each port of each line card, and a PON (Passive Optical Network) port of the OLT system must support a multicast service for each Optical Network Unit (ONU) system. Also, the ONU system must support a multicast service for each subscriber port.

An OLT system supports a multicast service for its ports using L3 (Layer 3) routing and multicasting, while an ONU system supports a multicast service according to an IGMP (Internet Group Management Protocol) snooping method that processes L3 multicast packets using a L2 (Layer 2) switch. In this case, since the OLT system handles a PON port to which a plurality of ONU systems are connected, when the OLT system performs a L3 multicast service, multicast packets that should be sent to specific ONU systems are transmitted to all ONU systems connected to the PON port. As a result, an ONU system whose multicast address exists in a L2 multicast forwarding table can send a multicast packet to a subscriber port belonging to a corresponding multicast group, however, the other ONU systems whose their multicast addresses don't exist in the L2 multicast forwarding table flood the multicast packet. Accordingly, a problem is generated that all subscribers belonging to the ONU system receive the multicast packet having no concern with them.

SUMMARY OF THE INVENTION

The present invention provides a multicast service supporting method which allows a multicast packet to be transmitted only to a specific ONU system belonging to a multicast address group among a plurality of ONU systems when a multicast service is provided in an Ethernet Passive Optical Network (EPON) system.

According to an aspect of the present invention, there is provided a multicast service providing method, which is implemented in an Ethernet passive optical network where a plurality of optical network unit systems are connected centering on an optical line terminal system, the method comprising: (a) the optical network unit system monitoring a multicast protocol report message transmitted from a subscriber and creating a first L2 multicast forwarding table; (b) the optical line terminal system monitoring the multicast protocol report message and creating a L3 multicast forwarding table; (c) the optical line terminal system receiving a multicast address and optical network unit identifier information from the optical network unit system and creating a second L2 multicast forwarding table in a PON (Passive Optical Network) port; (d) if a multicast server transmits a multicast packet using a multicast address which the subscriber has registered, the optical line terminal system transmitting the multicast packet to a predetermined port using the L3 multicast forwarding table, searching for optical network unit systems belonging to a corresponding multicast group using the created second L2 multicast forwarding table if the port to which the multicast packet should be transmitted is a PON port, and transmitting the multicast packet to the searched optical network unit systems; and (e) the optical network unit system which has received the multicast packet, transmitting the multicast packet to subscribers belonging to the corresponding multicast group using the first L2 forwarding table.

According to another aspect of the present invention, there is provided a multicast service supporting method, which is performed by an optical line terminal connected to a plurality of optical network unit systems in an Ethernet passive optical network, the method comprising: (a) determining whether or not a packet received to the optical line terminal system is a multicast packet; (b) if it is determined that the packet is not the multicast packet, processing the packet using a unicast method or a broadcast method; (c) if it is determined that the packet is the multicast packet, finding a port to be forwarded in a L3 multicast forwarding table using a multicast IP address of the packet, the L3 multicast forwarding table including multicast IP address information and interface port information; (d) if the port is not a PON port, transmitting the multicast packet to the optical network unit systems; (e) if the port is a PON port, searching for a MLLID (Multicast Logical Link ID) value in a L2 multicast forwarding table including multicast MAC addresses and identifier numbers of the optical network unit systems; and (f) if a multicast MAC address of the packet exists in the L2 multicast forwarding table, setting the MLLID value in the preamble of the packet and transmitting the packet to the optical network unit systems.

According to another aspect of the present invention, there is provided a multicast service supporting method, which is performed by each of a plurality of optical network unit systems connected to an optical line terminal system in an Ethernet passive optical network, the method comprising: (a) determining whether or not a packet received to each optical network unit system is a multicast packet; (b) if it is determined that the packet is not the multicast packet, processing the packet using a unicast method or a broadcast method; (c) if it is determined that the packet is the multicast packet, determining whether or not a MLLID value included in a preamble of the packet is identical with a MLLID value of the optical network unit; (d) if it is determined that both the MLLID values are not the same, discarding the multicast packet; (e) if it is determined that both the MLLID values are the same, finding a corresponding multicast MAC address from a L2 multicast forwarding table including multicast MAC addresses and a corresponding port number of the optical network unit system and obtaining a list of subscriber ports to be forwarded; and (f) transmitting the multicast packet to a corresponding subscriber port included in the list of subscriber ports obtained in step (e).

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described in detail with reference to the appended drawings. The same reference numbers refer to the same components throughout the drawings.

Figure 1:
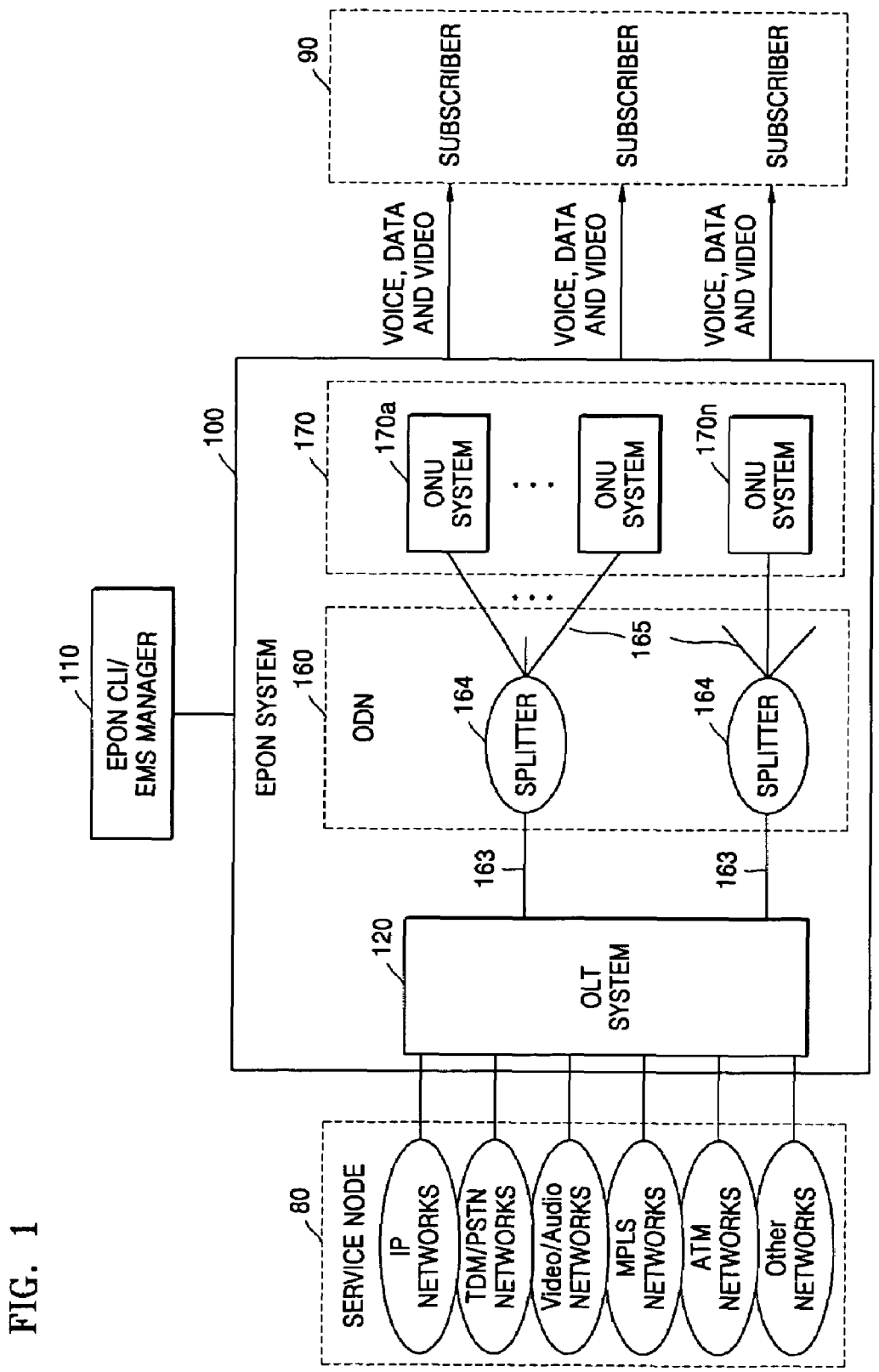
FIG. 1 is a block diagram of an Ethernet Passive Optical Network (EPON) system to which the present invention is applied.

FIG. 1 is a block diagram of an Ethernet Passive Optical Network (EPON) system to which the present invention is applied. Referring to FIG. 1, an EPON system 100 which is located at the root of a tree structure includes an Optical Line Terminal (OLT) system 120, an Optical Distribution Network (ODN) 160, and a plurality of Optical Network Unit (ONU) systems 170.

The OLT system 120, which is a terminal of a service provider, converts electrical signals to optical signals and provides the optical signals to respective subscribers of the EPON. That is, the OLT system 120 connects subscriber traffic to service nodes 80 that support an IP network, a TDM (Time Division Multiplex)/PSTN (Public Switched Telephone Network) network, a video/audio network, a MPLS (Multiprotocol Label Switching) network, an ATM (Asynchronous Transfer Mode) network, and other various networks.

In the present invention, the OLT system 120 captures an IGMP Report message received from a subscriber 90, creates a L3 multicast forwarding table for supporting a L3 multicast service, and creates a L2 multicast forwarding table using a multicast MAC address and ONU ID information transmitted from the ONU system 170. Also, when receiving a multicast packet, the OLT system 120 searches for a port to be forwarded in the L3 multicast forwarding table using a multicast IP address of the multicast packet and finds a MLLID (Multicast Logical Link ID) value corresponding to the port in the L2 multicast forwarding table if the searched port is a PON port, so that the ONU system 170 can transmit the multicast packet only to a desired subscriber. Then, the OLT system 120 sets the found MLLID value in the preamble of the packet and transfers the packet to the ONU system 170.

The ODN 160 is connected between the OLT system 120 and the ONU system 170 and divides an optical signal transmitted from the OLT system 120 to a plurality of optical signals. For that, the ODN 160 includes a plurality of optical lines 163 and 165 and a plurality of passive splitters 164.

Also, the ONU system 170, which is a terminal of a subscriber side, is connected to the OLT system 120 through the ODN 160, and performs subscriber interfacing for supporting data, video, and audio services, and network interfacing for upward traffic to the OLT system 120.

In the present invention, each of the ONU systems 170a through 170n captures an IGMP Report message received from each subscriber 90, creates a L2 multicast forwarding table for supporting L2 multicast switching, respectively, and determines whether a MLLID value allocated to a preamble of a multicast packet is identical with its own MLLID value when receiving the multicast packet from the OLT system 120. If it is determined that both the MLLID values are the same, each of the ONU systems 170a through 170n searches for a corresponding multicast MAC address in the L2 multicast forwarding table, obtains a list of subscriber ports to be forwarded, and transmits the multicast packet to corresponding subscriber ports included in the obtained subscriber port list.

The EPON system 100 as described above is managed by an EPON CLI (Common Line Interface) or EMS (Element Management System) manager 110 connected to the OLT system 120.

Figure 2:
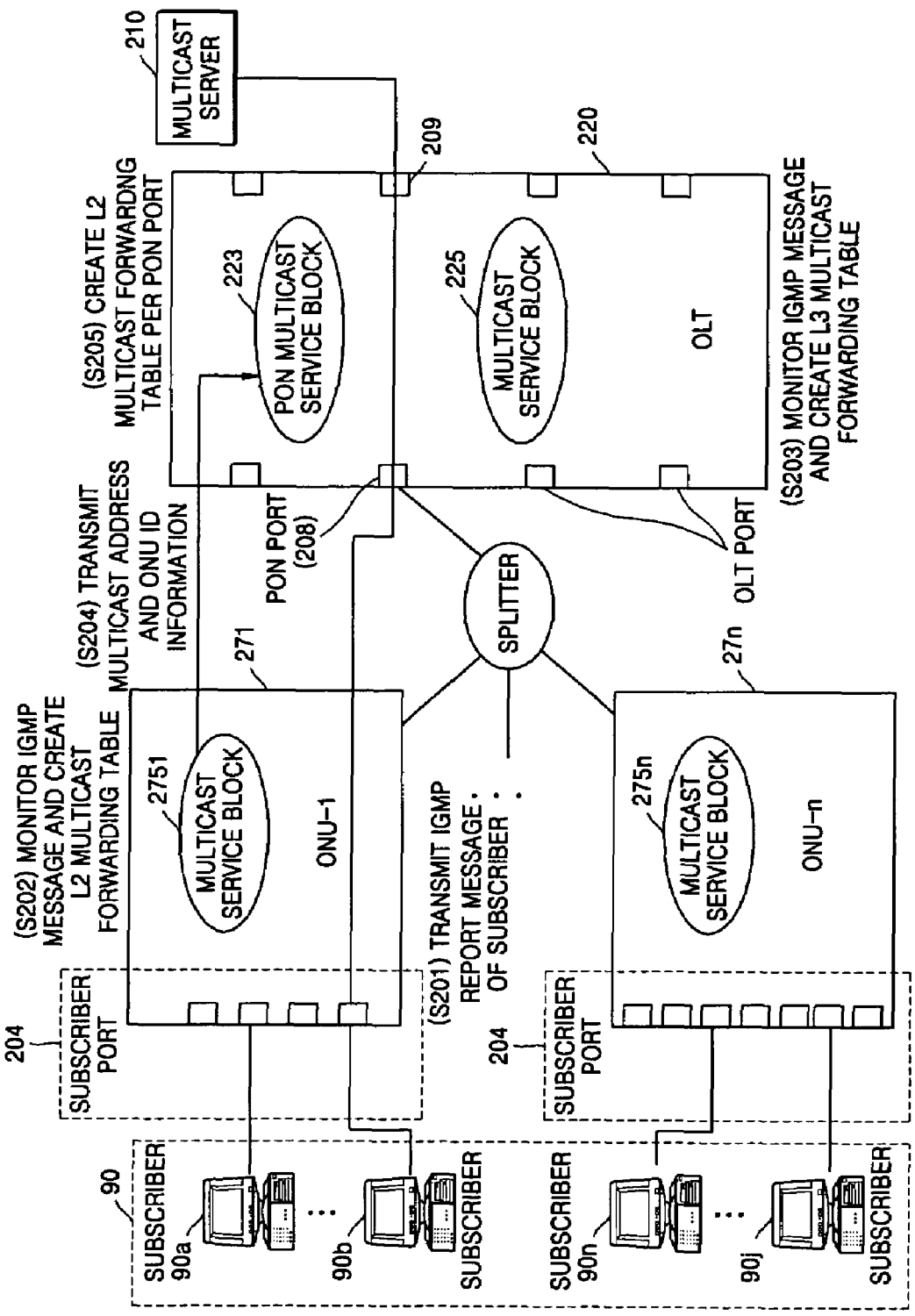
FIG. 2 is a view for explaining an IGMP registration message processing method which is performed by an ONU system and an OLT system, according to an embodiment of the present invention.

FIG. 2 is a view for explaining an IGMP registration message processing method which is performed by ONU systems 271 through 27n and an OLT system 220, according to an embodiment of the present invention.

Referring to FIG. 2, when a subscriber 90b connected to a subscriber port 204 of one of the ONU systems 271 registers to a multicast server 210 for a multicast service, the subscriber 90b first transmits an IGMP Report message to the multicast server 210 (step S201).

A multicast service block 2751 of the ONU system 271 that received the IGMP Report message from the subscriber 90b captures the IGMP Report message for supporting L2 multicast switching and creates a L2 multicast forwarding table (step S202). The L2 multicast forwarding table of the ONU system 271 includes information for multicast MAC addresses and corresponding port numbers of the ONU system 271.

Meanwhile, the multicast service block 225 of the OLT system 220 captures the IGMP Report message and creates a L3 multicast forwarding table for supporting a L3 multicast service (step S203).

Then, the ONU system 271 transmits a multicast MAC address and its own ONU ID information to a PON multicast service block 223 of the OLT system 220 (step S204). The PON multicast service block 223 of the OLT system 220 creates a L2 multicast forwarding table using the multicast MAC address and ONU ID information received from the ONU system 271 (step S205). The multicast service providing method described above with reference to FIG. 2 is performed by an IGMP protocol, however, can be performed by other multicast protocols than the IGMP protocol.

Figure 3:
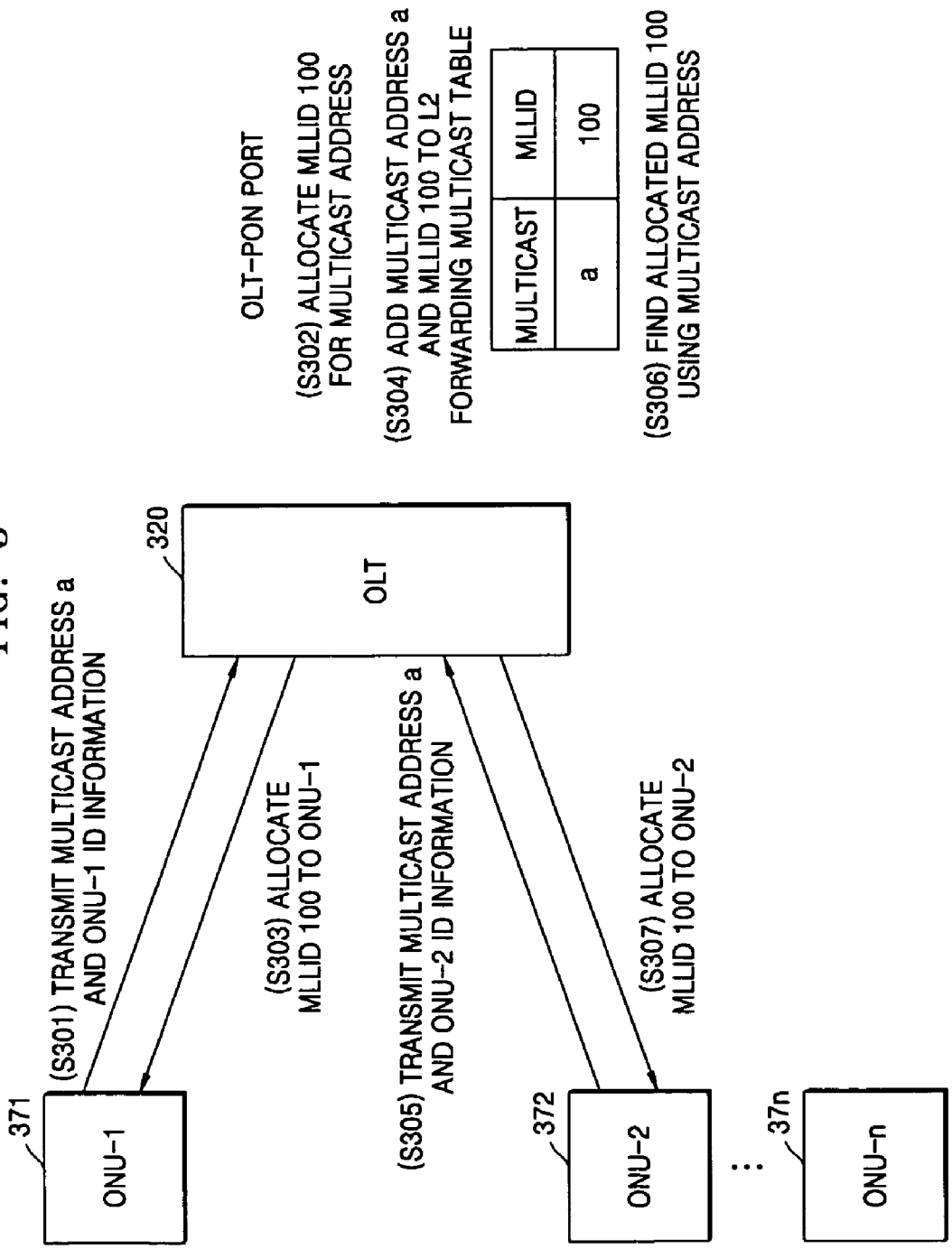
FIG. 3 is a view for explaining a method for creating a L2 multicast forwarding table for a PON port of an OLT system, according to an embodiment of the present invention.

FIG. 3 is a view for explaining a method for creating a L2 multicast forwarding table for a PON port of an OLT system 320, according to an embodiment of the present invention.

Referring to FIG. 3, an ONU-1 371 captures an IGMP Report message received from a subscriber, acquires a multicast address a from the IGMP Report message, and transmits the multicast address a with its own ONU ID information to the OLT system 320 (step S301).

The OLT system 320 searches for a L2 multicasting forwarding table of a corresponding PON port, and newly allocates a MLLID (Multicast Logical Link ID; 100) if the corresponding multicast address does not exist in the L2 multicast forwarding table (step S302). Then, the OLT system 320 transmits a message indicating that a MLLID value of 100 is allocated, to the ONU-1 371 (step S303). Then, the OLT system 320 adds the multicast address a and the newly allocated MLLID value 100 to the L2 multicast forwarding table (step S304).

Successively, an ONU-2 372 acquires the multicast address a from the IGMP Report message transmitted from the subscriber and transmits the multicast address a with its own ONU ID information to the OLT system 320 (step S305). The OLT system 320 searches for a MLLID 100 corresponding to the multicast address a from the L2 multicast forwarding table of the corresponding PON port (step S306), and transmits a message indicating that a MLLID value of 100 is allocated (step S307), to the ONU-2 372.

Figure 4:
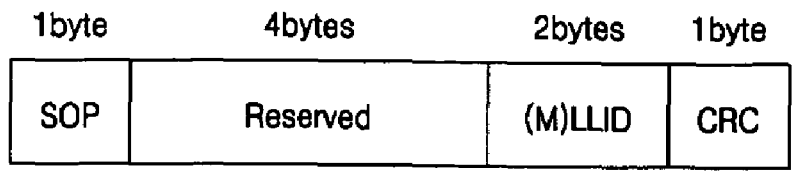
FIG. 4 shows a configuration of a preamble of 8 bytes that is used for Ethernet frame receipt/transmission between ONU systems and an OLT system, according to an embodiment of the present invention.

FIG. 4 shows a configuration of a preamble of 8 bytes that is used for Ethernet frame receipt/transmission between ONU systems and an OLT system, according to an embodiment of the present invention.

Referring to FIG. 4, 2 bytes among the preamble of 8 bytes that is used for Ethernet frame receipt/transmission between the ONU systems and the OLT system are used for a MLLID or LLID (Logical Link ID) for identifying the respective ONU systems.

The OLT system 420 allocates MLLIDs to the respective ONU systems when creating a L2 multicast forwarding table for PON ports. A MLLID or LLID value is used to indicate which ONU system should receive the corresponding frame upon downward transmission from an OLT system to an ONU system, and to indicate which ONU system among a plurality of ONU systems sent the corresponding frame upon upward transmission from an ONU system to an OLT system.

Figure 5:
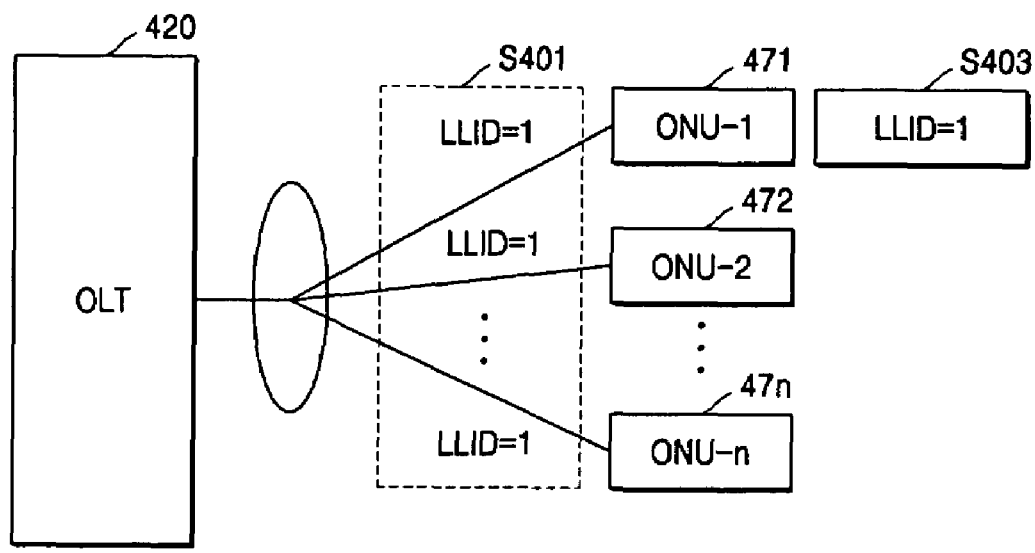
FIG. 5 is a view for explaining a process for transmitting a unicast Ethernet frame from an OLT system to ONU systems using a LLID (Logical Link ID), according to an embodiment of the present invention.

FIG. 5 illustrates a process which transmits a unicast Ethernet frame from an OLT system 420 to ONU systems 471 through 47n using a LLID (Logical Link ID), according to an embodiment of the present invention.

Referring to FIG. 5, when an OLT system 420 tries to transmit a unicast Ethernet frame to an ONU-1 471 among a plurality of ONU systems 471 through 47n, the OLT system 420 allocates a LLID value of 1 to the ONU-1 471, includes the LLID value (that is, 1) in the preamble of the Ethernet frame, and then transmits the Ethernet frame (step S401). If other ONU systems 472 through 47n to which the LLID value is not allocated receive the Ethernet frame, the ONU systems 472 through 47n discard the Ethernet frame, and if the ONU-1 471 to which the LLID value (that is, 1) is allocated receives the Ethernet frame, the ONU-1 471 processes the Ethernet frame (step S403). As a result, the OLT system 420 can transmit the Ethernet packet only to a specific desired ONU system among the plurality of ONU systems 471 through 47n.

Figure 6:
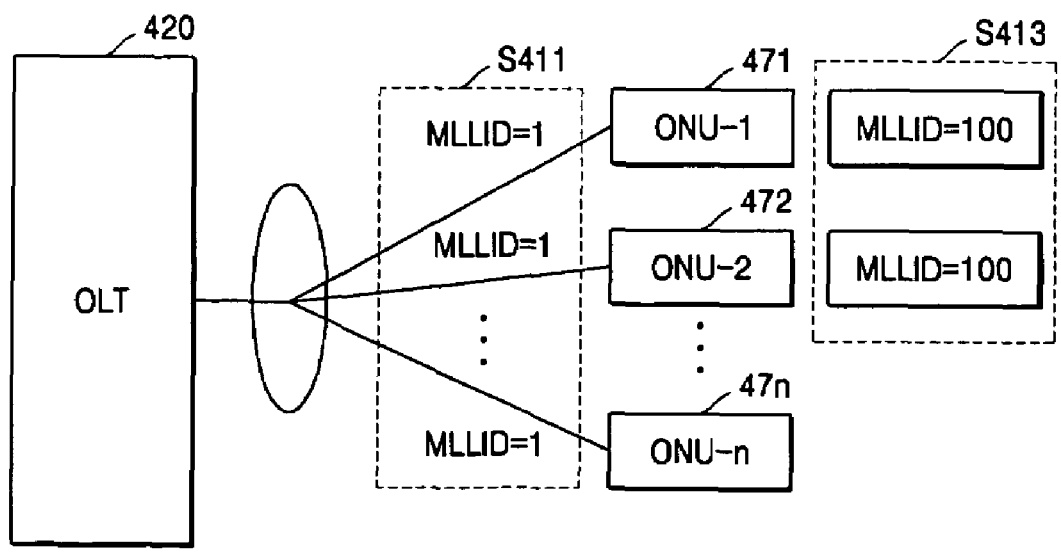
FIG. 6 is a view for explaining a process for transmitting a multicast Ethernet frame from an OLT system to ONU systems using a MLLID (Multicast Logical Link ID), according to an embodiment of the present invention.

FIG. 6 illustrates a process which transmits a multicast Ethernet frame from an OLT system 420 to ONU systems 471 through 47n using a MLLID (Multicast Logical Link ID), according to an embodiment of the present invention.

Referring to FIG. 6, when an OLT system 420 tries to transmit a multicast Ethernet frame only to an ONU-1 471 and an ONU-2 472 among a plurality of ONU systems 471 through 47n, the OLT system 420 sets a corresponding MLLID (that is, 100) in the preamble of the multicast Ethernet frame and transmits the multicast Ethernet frame to the plurality of the ONU systems 471 through 47n (step S411). Then, only the ONU-1 47 and ONU-2 472 to which the MLLID value is allocated receive the multicast Ethernet frame (step S413) and the other ONU systems discard the multicast Ethernet frame. As a result, the OLT system 420 can transmit the multicast packet only to the specific ONU systems 471 and 472 belonging to a corresponding multicast address group among the plurality of ONU systems 471 through 47n.

Figure 7:
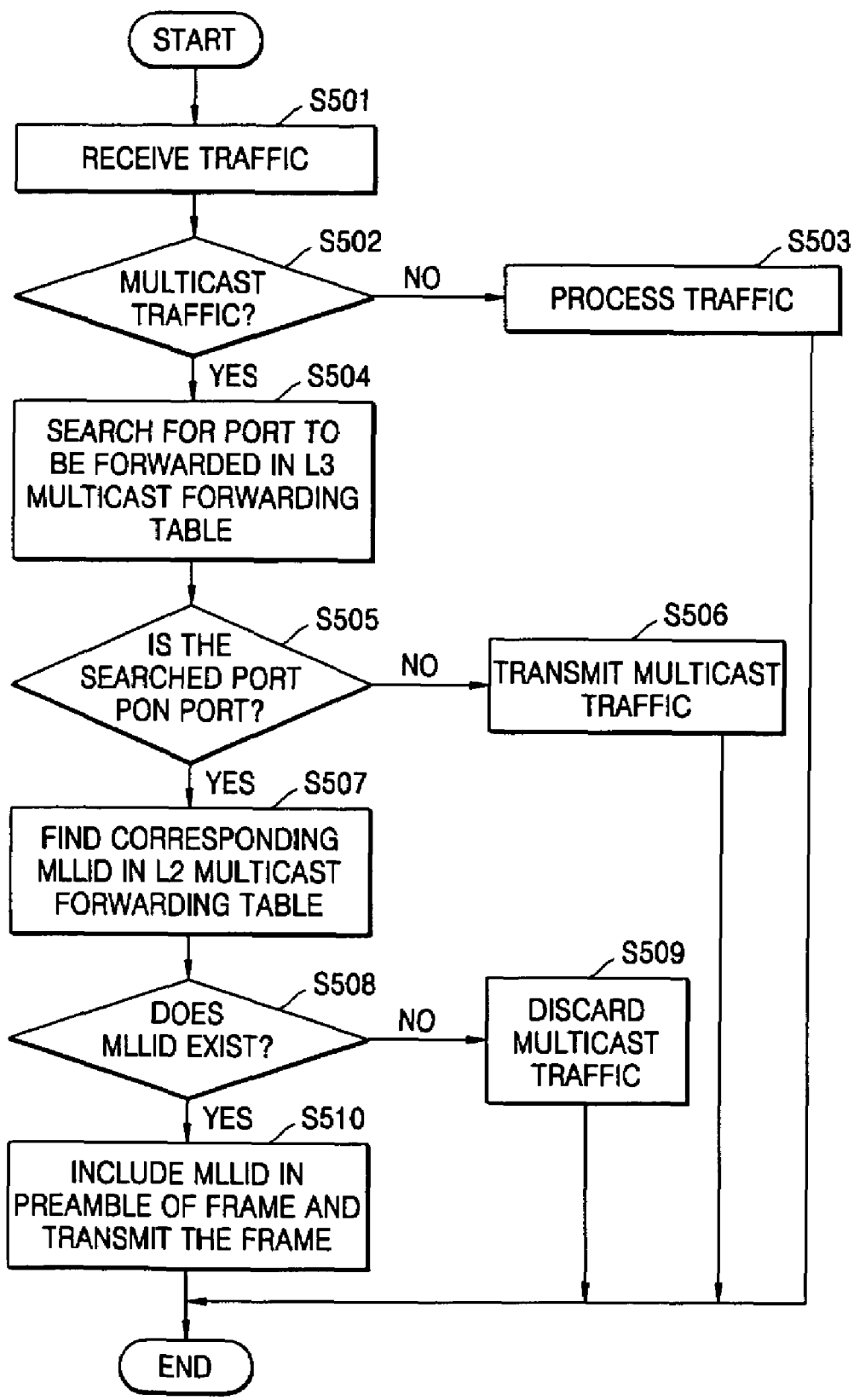
FIG. 7 is a flowchart illustrating a method in which the OLT system processes a multicast packet when transmitting the multicast packet, according to an embodiment of the present invention.

FIG. 7 is a flowchart illustrating a multicast packet processing method performed by an OLT system upon packet transmission, according to an embodiment of the present invention, wherein the multicast packet processing method is performed by the OLT system when a multicast server transmits a multicast packet to subscribers.

Referring to FIG. 7, when an OLT system receives a traffic in step 501, the OLT system determines whether or not the received traffic is a multicast traffic in step 502.

If it is determined in step 502 that the received traffic is not the multicast traffic, the OLT system transmits the traffic using a unicast method or a broadcast method in step 503. If it is determined in step 502 that the received traffic is the multicast traffic, in step 504, the OLT system searches for a port to be forwarded from a L3 multicast forwarding table created using a corresponding multicast IP address, and in step 505, determines whether or not the port to which the traffic should be transmitted is a PON port.

If it is determined in step 505 that the port to which the traffic should be transmitted is not the PON port, the OLT system transmits the multicast traffic to all ONU systems in step 506. If it is determined in step 505 that the port to which the traffic should be transmitted is the PON port, since the OLT system should transmit the traffic only to a specific ONU system belonging to a corresponding multicast group, the OLT system searches for a MLLID from a predetermined L2 multicast forwarding table using a multicast MAC address in step 507, and determines whether or not the multicast MAC address exists in the L2 multicast forwarding table in step 508.

If it is determined in step 508 that the multicast MAC address does not exist in the L2 multicast forwarding table, the OLT system discards the multicast traffic in step 509. If it is determined in step 508 that the multicast MAC address exists in the L2 multicast forwarding table, the OLT system sets a corresponding MLLID value in the preamble of the Ethernet frame and transmits the Ethernet frame to ONU systems in step 510.

Figure 8:
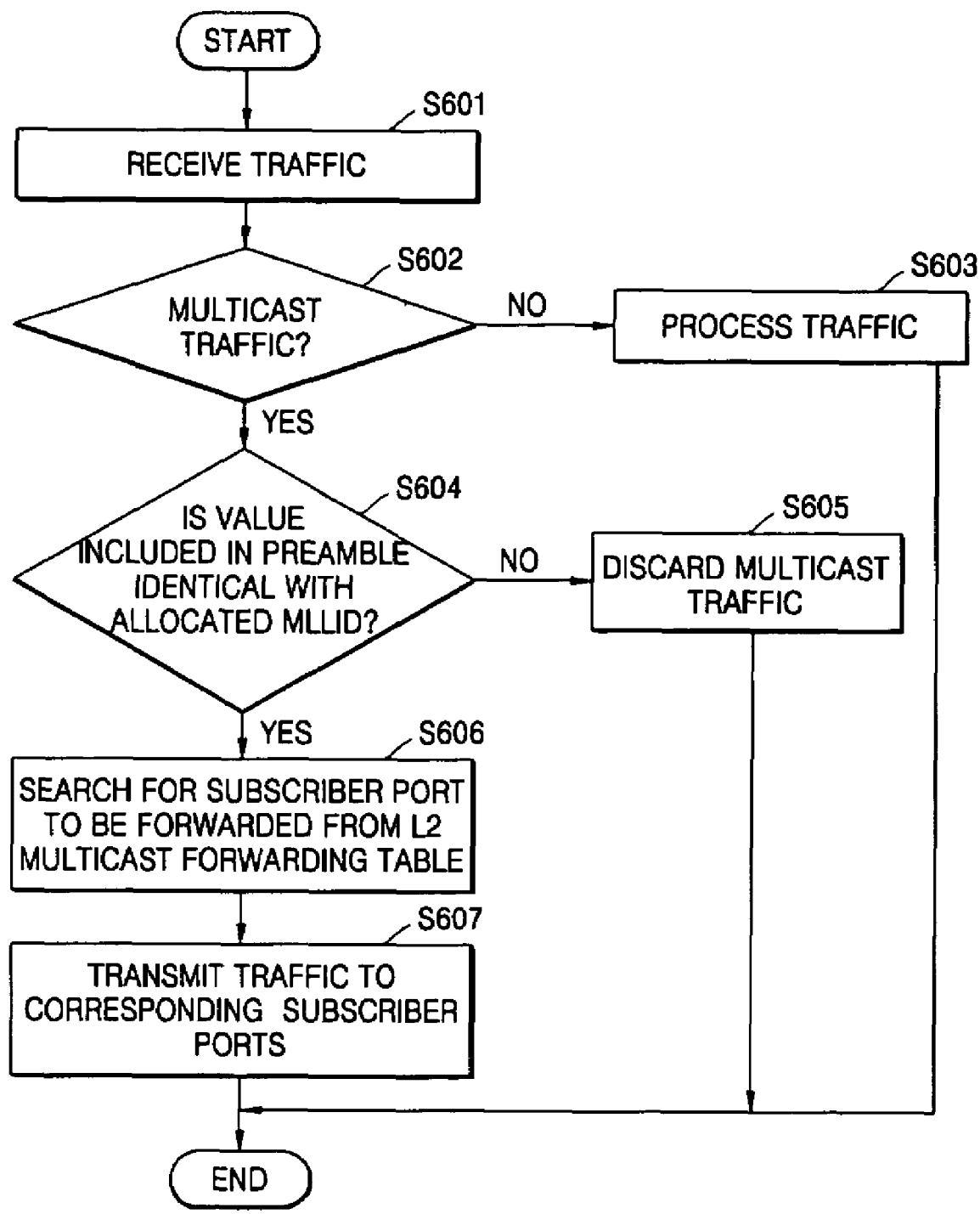
FIG. 8 is a flowchart illustrating a method in which the ONU system processes a multicast packet when receiving the multicast packet, according to an embodiment of the present invention.

FIG. 8 is a flowchart illustrating a multicast packet processing method performed by an ONU system upon packet receipt, according to an embodiment of the present invention, wherein the multicast packet processing method is performed by an ONU system that received a multicast packet from an OLT system when a multicast server transmits the multicast packet to subscribers.

Referring to FIG. 8, if an ONU system receives a traffic in step 601, the ONU system determines whether or not the received traffic is a multicast traffic in step 602.

If it is determined in step 602 that the received traffic is not the multicast traffic, the ONU system processes the traffic using a unicast method or a broadcast method in step 603. If it is determined in step 602 that the received traffic is the multicast traffic, the ONU system checks whether or not a MLLID value included in the preamble of the corresponding traffic is identical with its own MLLD value in step 604.

If it is determined in step 604 that both the MLLID values are not the same, the ONU system discards the multicast traffic in step 605. Otherwise, the ONU system searches for a corresponding multicast MAC address in the L2 multicast forwarding table and obtains a list of subscriber ports to be forwarded in step 606. Then, in step 607, the ONU system transmits the multicast traffic to corresponding subscriber ports with reference to the list of subscriber ports obtained in step 606.

As described above, if a subscriber transmits an IGMP Report message to register a multicast server, the ONU system monitors the IGMP Report message, creates a L2 multicast forwarding table, and transmits a multicast MAC address and an ONU system identifier to a PON port of the OLT system. Then, the OLT system monitors the IGMP Report message, creates a L3 multicast forwarding table, and creates separate L2 multicast forwarding information for the corresponding PON port using information received from the ONU system.

Successively, if the multicast server transmits the multicast packet using the multicast address which the subscriber has registered the multicast server, the OLT system receives the multicast packet and transmits the multicast packet to a corresponding port using the created L3 multicast forwarding table. At this time, if the port to which the multicast packet should be transmitted is an PON port, the OLT system transmits the multicast packet only to ONU systems belonging to a corresponding multicast group using the created L2 multicast forwarding information. The ONU system which received the multicast packet from the OLT system transmits the multicast packet only to subscribers belonging to the multicast group using the created L2 forwarding information.

The present invention may be embodied as a program stored on a computer readable medium that can be run on a general computer. Here, the computer readable medium includes but is not limited to storage media such as magnetic storage media (e.g., ROM's, floppy disks, hard disks, etc.), optically readable media (e.g., CD-ROMs, DVDs, etc.), and carrier waves (e.g., transmission over the Internet). The present invention may also be embodied as a computer readable program code unit stored on a computer readable medium, for causing a number of computer systems connected via a network to affect distributed processing.

As described above, in the method for supporting the multicast service in the Ethernet passive optical network (EPON), according to the present invention, since an ONU system monitors an IGMP message, informs the monitored result of an OLT system, allows the OLT system to create L2 multicast forwarding information using a multicast address and ONU ID information in a PON port, and transmits the multicast packet only to desired subscribers on the basis of the created L2 multicast forwarding information when receiving a multicast packet, it is possible to transfer a multicast packet only to a specific ONU system belonging to a corresponding multicast address group among a plurality of ONU systems.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multicast service providing method, which is implemented in an Ethernet passive optical network where a plurality of optical network unit systems are connected centering on an optical line terminal system, the method comprising:
   (a) an optical network unit system monitoring a multicast protocol report message transmitted from a subscriber and creating a first Layer 2 (L2) multicast forwarding table;
   (b) an optical line terminal system monitoring the multicast protocol report message and creating a Layer 3 (L3) multicast forwarding table;
   (c) the optical line terminal system receiving a multicast address and optical network unit identifier information from the optical network unit system and creating a second L2 multicast forwarding table in a PON (Passive Optical Network) port;
   (d) if a multicast server transmits a multicast packet using a multicast address which the subscriber has registered, the optical line terminal system transmitting the multicast packet to a predetermined port using the L3 multicast forwarding table, searching for optical network unit systems of the plurality of optical network unit systems belonging to a corresponding multicast group using the created second L2 multicast forwarding table if the port to which the multicast packet should be transmitted is a PON port, and transmitting the multicast packet to the searched optical network unit systems; and
   (e) the optical network unit system which has received the multicast packet, transmitting the multicast packet to subscribers belonging to the corresponding multicast group using the first L2 forwarding table.

2. The method of claim 1, wherein the multicast protocol report message is an IGMP (Internet Group Management Protocol) report message.

3. The method of claim 1, wherein the first L2 multicast forwarding table includes a multicast MAC address and a corresponding port number of the optical network unit system.

4. The method of claim 3, wherein the second L2 multicast forwarding table includes the multicast MAC address and an identifier number of the optical network unit system.

5. The method of claim 1, wherein the L3 multicast forwarding table includes a multicast IP address and interface port information.

6. The method of claim 1, wherein step (d) comprises:
   (d-1) determining whether or not a packet received to the optical line terminal system is a multicast packet;
   (d-2) if the received packet is not the multicast packet, processing the packet using a unicast method or a broadcast method;
   (d-3) if the received packet is the multicast packet, finding a port to be forwarded in the L3 multicast forwarding table using a multicast IP address of the packet;
   (d-4) if the port is not a PON port, transmitting the multicast packet to the optical network unit systems; and
   (d-5) if the port is a PON port, searching for a MLLID (Multicast Logical Link ID) in the second L2 multicast forwarding table, and if a multicast MAC address of the packet exists in the second L2 multicast forwarding table, setting the MLLID value in a preamble of the packet and transmitting the packet to the optical network unit systems.

7. The method of claim 1, wherein step (e) comprises:
   (e-1) determining whether or not a packet received to the optical network unit is a multicast packet;
   (e-2) if the packet is not the multicast packet, processing the packet using a unicast method or a broadcast method;
   (e-3) if the packet is the multicast packet, determining whether or not a MLLID value included in the preamble of the packet is identical with a MLLID value of the optical network unit system;
   (e-4) if both the MLLID values are not the same, discarding the multicast packet; and
   (e-5) if both the MELID values are the same, searching for a corresponding multicast MAC address in the first L2 multicast forwarding table, obtaining a list of subscriber ports to be forwarded, and transmitting the multicast packet to a corresponding subscriber port included in the list.

8. A multicast service supporting method, which is performed by an optical line terminal connected to a plurality of optical network unit systems in an Ethernet passive optical network, the method comprising:
(a) determining whether or not a packet received to the optical line terminal system is a multicast packet;
(b) if the packet is not the multicast packet, processing the packet using a unicast method or a broadcast method;
(c) if the packet is the multicast packet, finding a port to be forwarded in a Layer 3 (L3) multicast forwarding table using a multicast IP address of the packet, the L3 multicast forwarding table including multicast IP address information and interface port information;
(d) if the port is not a PON port, transmitting the multicast packet to the plurality of optical network unit systems;
(e) if the port is a PON port, searching for a MLLID (Multicast Logical Link ID) value in a Layer 2 (L2) multicast forwarding table including multicast MAC addresses and identifier numbers of the plurality of optical network unit systems; and
(f) if a multicast MAC address of the packet exists in the L2 multicast forwarding table, setting the MLLID value in a preamble of the packet and transmitting the packet to the plurality of optical network unit systems.

9. A multicast service supporting method, which is performed by each of a plurality of optical network unit systems connected to an optical line terminal system in an Ethernet passive optical network, the method Comprising: (a) determining whether or not a packet received to an optical network unit system is a multicast packet; (b) if the packet is not the multicast packet, processing the packet using a unicast method or a broadcast method; (c) if the packet is the multicast packet, determining whether or not a MLLID value included in a preamble of the packet is identical with a Multicast Logical Link ID (MLLID) value of the optical network unit; (d) if both the MLLID values are not the same, discarding the multicast packet; (e) if both the MLLID values are the same, finding a corresponding multicast MAC address from a Layer 2 (L2) multicast forwarding table including multicast MAC addresses and a corresponding port number of the optical network unit system and obtaining a list of subscriber ports to be forwarded; and (f) transmitting the multicast packet to a corresponding subscriber port included in the list of subscriber ports obtained in step (e).

* * * * *